United States Patent [19]

Maglio

[11] 4,416,926
[45] Nov. 22, 1983

[54] STYLIZED SURFACE FINISHES

[75] Inventor: Ralph A. Maglio, Wadsworth, Ohio

[73] Assignee: The Firestone Tire & Rubber Company, Akron, Ohio

[21] Appl. No.: 349,142

[22] Filed: Feb. 16, 1982

Related U.S. Application Data

[63] Continuation-in-part of Ser. No. 126,614, Mar. 3, 1980, abandoned.

[51] Int. Cl.³ .............................................. B60R 13/00
[52] U.S. Cl. ...................................... 428/31; 264/46.7; 301/63 PW; 301/37 P; 428/304.4; 428/313.3; 428/313.5; 428/313.7; 428/313.9; 428/317.9
[58] Field of Search ............... 428/304.4, 317.9, 313.3, 428/313.5, 313.7, 313.9, 31; 264/46.7; 301/63 PW, 37 P

[56] References Cited

U.S. PATENT DOCUMENTS

3,669,501  6/1972  Derleth .............................. 301/37 R
4,153,657  5/1979  Wilcox ................................ 264/46.6
4,252,378  2/1981  DeBolt et al. ................. 301/63 DD

FOREIGN PATENT DOCUMENTS

1327845  11/1974  United Kingdom .

*Primary Examiner*—George F. Lesmes
*Assistant Examiner*—P. R. Schwartz
*Attorney, Agent, or Firm*—Daniel N. Hall

[57] ABSTRACT

A stylized cover having a surface element and foam substrate is adhered to a steel or plastic base through said foam. Examples of plastic base materials include polyurethanes, polyamides, epoxies and structural foams of polycarbonates or polyesters such as polybutylene terephthalate. The plastic base may be solid or reinforced. The surface element may be highly decorated with chromeplating, metal, plastic, or the like. The syntactic foam substrate has unexpectantly good heat resistance, high compression strength, impact resistance, and is lightweight, and thus results in an excellent balance of property for lightweight application. A preferred use is the stylized cover such as a wheel cover.

10 Claims, 1 Drawing Figure

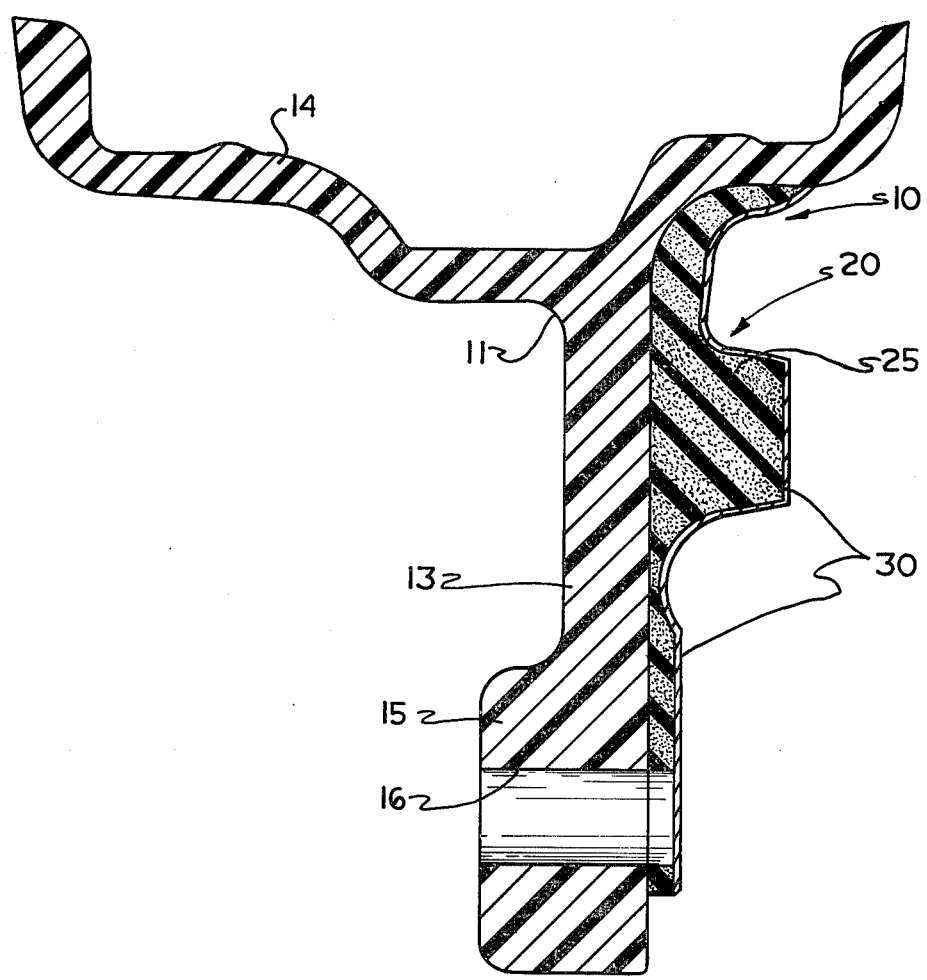

STYLIZED SURFACE FINISHES

CROSS-REFERENCE

This application is a continuation-in-part of U.S. application, Ser. No. 126,614, filed Mar. 3, 1980 now abandoned, and entitled "STYLIZED SURFACE FINISHES".

TECHNICAL FIELD

The present invention relates to a stylized cover which can be adhered by syntactic foam onto a steel or plastic base. A specific use is as a cover on a wheel.

BACKGROUND ART

U.S. Pat. No. 3,669,501 relates to a steel wheel having an ornamental plastic wheel cover adhered thereto by a plastic urethane foam. The outer cover may be chrome plated and stylized to yield an esthetic appearance.

U.S. Pat. No. 3,762,677 relates to a molded polyurethane wheel cover upon a steel wheel.

U.S. Pat. No. 3,815,200 is a division of the above discussed U.S. Pat. No. 3,762,677 and is identical thereto.

U.S. Pat. No. 3,968,996 relates to a wheel which is manufactured by placing a steel rim, a steel inner disk, and a steel outer disk in a die and injecting a polyurethane foam composition into the enclosed volumes such that a polyurethane foam acts as a load-bearing and load-transmitting structural element.

U.S. Pat. No. 4,000,926 is similar to the above previously mentioned U.S. Pat. No. 3,968,996 in that it also relates to injecting an organic resin foam which functions as a load-bearing component of a wheel in association with a plurality of structural members secured to each other and defining a cavity. One of the members is an outboard member that defines an outboard disk side and includes a plurality of radially extending openings that are spaced circumferentially with respect to one another with a plurality of ribs projecting in an outboard direction through the openings so as to give the wheel a stylized appearance and to cooperate with the structural members to enclose the cavity.

U.S. Pat. No. 4,035,028 is similar to the aboveidentified prior art patents in that it also relates to a wheel assembly comprising a plurality of components having an organic resin foam such as polyurethane which is injected into a cavity to form a load-bearing member.

U.S. Pat. No. 4,153,657 is yet another prior art patent wherein a three-piece vehicle wheel is filled with a polyurethane foam which functions as a load-bearing and load-transmitting structural element.

U.S. Pat. No. 3,756,658 relates to a high density urethane elastomer which is permanently attached to the outboard side of a wheel and has a decorative surface.

U.S. Pat. No. 3,956,451 also relates to a urethane elastomer which is molded to the side of a metal vehicle wheel to present a decorative appearance.

German Offenlegungsschrift No. 2457907 relates to a vehicle wheel which has rim center disk, mounted on a hub, on which the rim for the tire is mounted. The wheel has, besides metal components, a plastic component as by adhesive bonding, foam molding, or vulcanizing. The plastic component acts as a noisereducer and also protects certain decorative parts of the vehicle against accidental damage.

DISCLOSURE OF INVENTION

It is therefore an object of the present invention to provide a stylized cover adhered to a base.

It is an object of the present invention to provide a stylized cover, as above, having a surface element and a syntactic foam substrate.

It is another object of the present invention to provide a stylized cover, as above, which is adhered to said base by said syntactic foam.

It is a further object of the present invention to provide a stylized cover, as above, wherein the stylized cover is relatively inexpensive to make, very light in weight, and can be utilized as a wheel cover, or to finish metal products, or fiber reinforced products such as bumpers, hoods, truck doors, body panels, and the like.

It is an additional object of the present invention to provide a stylized cover, as above, wherein said syntactic foam has a high melting temperature, high compressive strength, and high impact resistance.

It is still another object of the present invention to provide a stylized cover, as above, wherein said synthetic foam is a polyester, an epoxy, a urethane, or a high vinyl butadiene.

It is still a further object of the present invention to provide a stylized cover, as above, wherein a resin matrix contains hollow microspheres to form said syntactic foam and reduce the density of said resin to result in a lightweight product.

It is still an additional object of the present invention to provide a stylized cover, as above, wherein said surface element may be made from materials such as plastic, paint, stainless steel, aluminum, nylon, ABS, and the like.

These and other objects of the present invention will become apparent from the following specification which describes in detail various embodiments without attempting to discuss all of the modifications in which the invention might be embodied, the invention being measured solely by the appended claims.

In general, a stylized article, comprises: a base material; a resin residing on said base material; said resin containing a plurality of hollow spheres to form a syntactic foam, the specific gravity of said syntactic foam ranging from about 0.3 grams per cc to about 1.0 grams per cc; and a stylized surface element, said stylized surface element residing on said syntactic foam and forming the stylized article.

BRIEF DESCRIPTION OF DRAWINGS

FIG. 1 is a cross-sectional view of a partial portion of a composite plastic vehicle wheel showing a stylized wheel cover applied to the wheel.

BEST MODE FOR CARRYING OUT THE INVENTION

Currently, some vehicle wheels are made out of composite plastic materials. However, it is very difficult to mold a fiber-reinforced plastic vehicle wheel having a stylized surface and obtain suitable fiber orientation at all desired parts of the wheel. Moreover, for each particular stylized cover, the wheel must be requalified to meet various safety standards and federal agencies.

According to the concepts of the present invention, stylized wheel covers are readily applied to standard production steel wheels or preferably plastic wheels with the foam substrate exhibiting improved properties of heat resistance, compression strength, and resistance to impact, as compared to the cast polyurethane stylizing techniques which lack a suitable combination of such properties.

Referring to FIG. 1, a stylized vehicle wheel is generally indicated by the number 10. In the embodiment shown, vehicle wheel 11 is made out of any conventional composite plastic material, although it can be made out of steel, magnesium, aluminum, or other conventional materials. Examples of plastic materials include polyurethanes, polyamids, epoxies and structural foams of polycarbonates or polyesters such as polybutylene terephthalate. The plastic base may be of solid construction or may contain reinforcing materials such as glass fiber, glass mat, glass cloth, or graphite. By the term "glass" is meant fiberglass. Wheel 11 has a disk portion 13 and a rim portion 14 which engages a tire (not shown). Hub portion 15 contains a bolt aperature 16 whereby wheel 11 is secured to a vehicle.

Stylized wheel cover 20 has a surface element 30 and a syntactic foam substrate 25. Considering syntactic foam 25, it is injected or otherwise inserted in a conventional manner into a cavity as formed by a mold with a wheel forming one side of the cavity and the stylized element forming the remaining side. The foam adheres to wheel 11 as well as to stylized element 30 and imparts strength to the latter. The foam may be of an shape, form, or thickness, and thus a vast number of specific stylized shapes may be made. Surface element 30 may be continuous over all of the axial outer surfaces of foam substrate 25 as shown in the drawing or it may only cover a portion thereof. Thus, the wheels are readily customized according to any number of designs, patterns, and forms. Examples of typical surface elements include stainless steel, chrome-plated steels, aluminum, plastics such as nylon, ABS (acrylontrile-butadiene-styrene terpolymer), polycarbonate, Noryl, a modified polyphenyleneoxide (i.e., modified by the incorporation of styrene—usually as a copolymer), a paint, and the like.

Although material 25 is commonly known and referred to in the art as a foam, it is not actually a foam since it is not made with any chemical or physical blowing agents whatsoever, but is produced by adding preformed hollow spheres to a liquid resin matrix. The foam resin matrix material can vary, for example, it can be polyester, an epoxy, a urethane, high vinyl butadiene, and the like, with polyester resins being desired and epoxy resins being preferred. The density of the syntactic foam may range from about 0.3 grams per cc to nearly the density of the resin itself, that is about 0.9 or 1.0 g/cc, depending upon the quantity, size, and density of hollow spheres added. A range of from about 0.5 g/cc to about 0.85 g/cc is more desirable with a range of from about 0.7 to about 0.8 being preferred. The spheres utilized are desirably microspheres, that is ranging in particle size from about 20 to about 200 microns in diameter and, at times, up to 500 microns in diameter. Common materials from which the spheres are made include silicate, epoxy, phenolic, glass, and Saran, with glass, silicate, and phenolic being preferred. Examples of specific spheres include Q-Cel manufactured by the Philadelphia Quartz Company, Glass Bubbles manufactured by 3-M Company, e.g., B23/500 Microballoons, Microballoons manufactured by Emerson & Cumings, and Phenolic Microballons manufactured by Union Carbide. The hollow spheres can also be made by expanding naturally occurring minerals such as perlite (a glassy volcanic rock manufactured by U.S. Gypsum), and coal dust.

The addition of hollow spheres to the resin matrix not only produces a foam-like material which is light in weight, but unexpectedly results in a material which has high impact strength and high compressive modulus. Thus, surface element 30 is reinforced by the foam and can take much abuse. In fact, the properties are of sufficient durability such that with a proper resin matrix, it will not melt due to heat generated under extreme braking conditions, and generally will not be cut or gouged due to the compressive strength and impact resistance, as will a polyurethane foam.

The preferred epoxy resin utilized as the matrix polymer can be commercial epoxy resins containing one or more epoxide groups per molecule or a combination of epoxide and secondary hydroxyl groups. Typical epoxy resins which can be utilized in the present invention include bisphenol-A epichlorohydrin resin, epoxy novalac resin, cycloaliphatic epoxy resin, brominated epoxy resin, and the like. The bisphenol-A epichlorohydrin resin is a preferred resin for the present invention and has the following formula

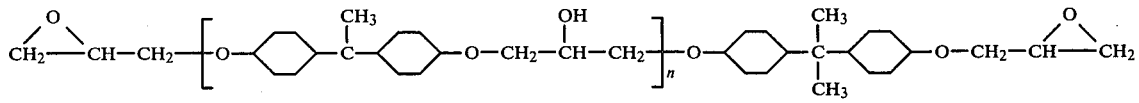

One such epoxy resin is known as EPON 828 manufactured by the Shell Chemical Company. The amount by weight of the microballoons in such a resin ranges from about 2 parts to about 50 parts per 100 parts of resin with a range of from about 20 to about 45 per 100 parts of resin being preferred.

As previously noted, the foam is generally injected into a cavity with the wheel on one side thereof. The syntactic foam inherently has good adhesive properties and therefore will readily adhere to a plastic wheel or a steel wheel. Naturally, if desired, any conventional adhesive may be applied to the outside of wheel 11 before the syntactic foam is applied thereon. Additionally, surface element 30 may be applied to foam 25 before it sets or else it may be adhered thereto using any conventional adhesive to form stylized wheel cover 20, which coincides with the wheel lugs or bolts as shown in the drawing.

Although a preferred embodiment and best mode of the invention have been set forth, it is to be understood that a stylized cover can be made for various base materials or items other than a wheel, for example, for vehicle components such as doors, body panels, hoods, bumpers, fenders, etc., as well as for finishing of fiber-reinforced plastic products, and the like.

This invention will be understood by the following by the following examples.

EXAMPLE I

A syntactic foam was made having the following formulation:

| INGREDIENT | PARTS BY WEIGHT |
| --- | --- |
| EPON 828 (an epoxy resin) | 100 |
| Epirez 505 (a flexibilizing epoxy resin, manufactured by Celanese Corporation) | 20 |
| NADIC Methylanhydride* | 90 |
| Hycar 1312 (a butadiene-acrylonitrile rubber produced by B. F. Goodrich) | 20 |
| B 23/500 (glass microspheres produced by 3M) | 28 |
| Tributylamine (a curing agent) | 1.5 |

*Methyl-4-endomethylenetetrahydrophthalic anhydride manufactured by CIBA Corporation under the tradename Hardener-906.

The above components were mixed in a blender at 150° F. to form a foam. The mix was then applied to a plastic wheel via a mold with a stainless steel surface element residing in a portion of the mold for 30 minutes at 220° F. Upon removal of the wheel from the mold, it was postcured for 1 hour at 300° F. The syntactic foam gave good adhesion to the wheel as well as to the stainless steel surface element thereon.

While the best mode and preferred embodiments of the present invention have been described in detail in accordance with the patent statutes, it is to be understood that the invention is measured by the attached claims.

What is claimed is:

1. A stylized article, comprising:
   a metal or plastic base material; said base material being a vehicle wheel,
   a resin residing on said base material;
   said resin containing a plurality of hollow spheres to form a syntactic foam, the specific gravity of said syntactic foam ranging from about 0.3 grams per cc to about 1.0 grams per cc; and
   a stylized surface element, said stylized surface element residing on said syntactic foam and forming the stylized article.

2. A stylized article according to claim 1, wherein said hollow spheres range from about 20 to about 500 microns in diameter.

3. A stylized article according to claim 2, wherein the density of said syntactic foam ranges from about 0.5 grams per cc to about 0.85 grams per cc and wherein the amount of said hollow spheres is from about 2 to about 50 parts by weight per 100 parts by weight of said resin.

4. A stylized article according to claim 3, wherein said syntactic resin is selected from the group consisting of a polyester resin, an epoxy resin, a urethane resin, a high vinyl butadiene resin, and combinations thereof.

5. A stylized article according to claim 1, wherein said hollow spheres are made from a material selected from the group consisting of silicate, epoxy, phenolic, glass, expanded coal dust, and perlite.

6. A stylized article according to claim 5, wherein said stylized surface element is a material selected from the group consisting of polycarbonate, acrylonitrile-butadiene-styrene terpolymer, steel, chrome-plated metals, aluminum, and a modified phenylene oxide resin.

7. A stylized article according to claim 4, 5, or 6, wherein said matrix resin is a material selected from the group consisting of a polyester and an epoxy and wherein said hollow spheres range from about 20 to about 200 microns in diameter.

8. A stylized article according to claim 7, wherein said wheel is made from plastic, steel, aluminum, or magnesium.

9. A stylized article according to claim 8, wherein the density of said syntactic foam ranges from about 0.7 to about 0.8 grams per cc and wherein the amount by weight of said microspheres ranges from about 20 to about 45 parts per 100 parts by weight of said resin.

10. A stylized article according to claim 8, wherein said wheel is made from a plastic selected from the group consisting of polyurethanes, polyamids, epoxies, and structural foams of polycarbonates or of polyesters.

* * * * *